United States Patent
Kim et al.

(10) Patent No.: US 12,039,147 B2
(45) Date of Patent: Jul. 16, 2024

(54) CONTENT BOX PROVIDING METHOD AND USER TERMINAL

(71) Applicant: KAKAO CORP., Jeju-si (KR)

(72) Inventors: You Jin Kim, Seongnam-si (KR); Yong Jun Kwon, Seongnam-si (KR); Hyun Ok Choi, Seongnam-si (KR); Han Gyeol Oh, Seongnam-si (KR); Kyung Moo An, Seongnam-si (KR); Eun Soo Heo, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/041,589

(22) PCT Filed: Aug. 13, 2021

(86) PCT No.: PCT/KR2021/010783
§ 371 (c)(1),
(2) Date: Feb. 14, 2023

(87) PCT Pub. No.: WO2022/035274
PCT Pub. Date: Feb. 17, 2022

(65) Prior Publication Data
US 2023/0297211 A1    Sep. 21, 2023

(30) Foreign Application Priority Data

Aug. 14, 2020 (KR) .................. 10-2020-0102767

(51) Int. Cl.
*G06F 3/00* (2006.01)
*G06F 3/0482* (2013.01)
(Continued)

(52) U.S. Cl.
CPC ........ *G06F 3/0482* (2013.01); *G06F 3/04845* (2013.01); *H04L 51/046* (2013.01)

(58) Field of Classification Search
CPC ... G06F 3/0482; G06F 3/04845; H04L 51/046
See application file for complete search history.

(56) References Cited

U.S. PATENT DOCUMENTS 8,285,856 B1 * 10/2012 Jain .................. G06F 16/24552
709/227
8,290,541 B2 * 10/2012 Marsh ................ G06Q 10/107
455/566
(Continued)

FOREIGN PATENT DOCUMENTS

JP        2016-134176 A      7/2016
KR    10-2013-0009446 A      1/2013
(Continued)

OTHER PUBLICATIONS

Mayo, Benjamin, "Opinion: Breadcrumb back button navigation on iPhone X is strangely 'undesigned'", Nov. 13, 2017, 9to5Mac, 3 pages.*

(Continued)

*Primary Examiner* — William L Bashore
*Assistant Examiner* — David Faber
(74) *Attorney, Agent, or Firm* — Seed IP Law Group LLP

(57) ABSTRACT

A link shared through a chat room in a chat application is displayed. When a selection of the link is received, a content execution result corresponding to the link through an in-app browser of the chat application or an external browser distinct from the chat application is displayed. A notification for a new chat message is then displayed while the content execution result is being displayed through the in-app browser or the external browser. When a selection for the notification of the new chat message is received, the display of the content execution result is switched to a display of the chat room in which the new chat message was received. A (Continued)

content box, which enables access to the content execution result, is displayed on the switched display of the chat room.

23 Claims, 10 Drawing Sheets

(51) Int. Cl.
  *G06F 3/04845* (2022.01)
  *H04L 51/046* (2022.01)

(56) References Cited

U.S. PATENT DOCUMENTS

| | | | | |
|---|---|---|---|---|
| 9,874,990 | B2* | 1/2018 | Khalatian | G06F 3/0481 |
| 10,346,514 | B2* | 7/2019 | Kim | G06Q 30/06 |
| 10,552,001 | B1* | 2/2020 | Lin | G06F 3/0483 |
| 11,543,937 | B2* | 1/2023 | Kannan | G06Q 30/016 |
| 2001/0018658 | A1* | 8/2001 | Kim | G06F 16/954 |
| | | | | 463/9 |
| 2007/0245249 | A1* | 10/2007 | Weisberg | G06F 9/451 |
| | | | | 709/204 |
| 2008/0059592 | A1* | 3/2008 | Marsh | G06Q 10/107 |
| | | | | 709/206 |
| 2013/0031462 | A1* | 1/2013 | Calvo | G06F 9/461 |
| | | | | 715/234 |
| 2013/0080928 | A1* | 3/2013 | Zhuang | G06Q 10/107 |
| | | | | 715/758 |
| 2013/0212466 | A1* | 8/2013 | Khalatian | G06F 3/0481 |
| | | | | 715/753 |
| 2014/0201660 | A1* | 7/2014 | Clausen | G06F 3/04883 |
| | | | | 715/769 |
| 2017/0109328 | A1* | 4/2017 | Kim | G06F 3/0482 |
| 2018/0229128 | A1* | 8/2018 | Chandrasekaran | A63F 13/87 |
| 2020/0311135 | A1* | 10/2020 | Kligman | G06F 16/972 |
| 2020/0401645 | A1* | 12/2020 | Brown | G06F 40/279 |
| 2021/0266275 | A1* | 8/2021 | Kim | G06F 3/1454 |

FOREIGN PATENT DOCUMENTS

| | | |
|---|---|---|
| KR | 10-1370316 B1 | 3/2014 |
| KR | 10-2016-0048968 A | 5/2016 |
| KR | 10-2017-0045841 A | 4/2017 |
| KR | 10-2017-0131573 A | 11/2017 |
| KR | 20220021787 A | 2/2022 |

OTHER PUBLICATIONS

"One interface for everything", Call Center Magazine; San Francisco vol. 15, Iss. 3, (Mar. 2002): 10-13 (3 pages).*
International Search Report dated Nov. 26, 2021 for PCT/KR2021/010783, citing the above reference(s). 5 pages.

* cited by examiner

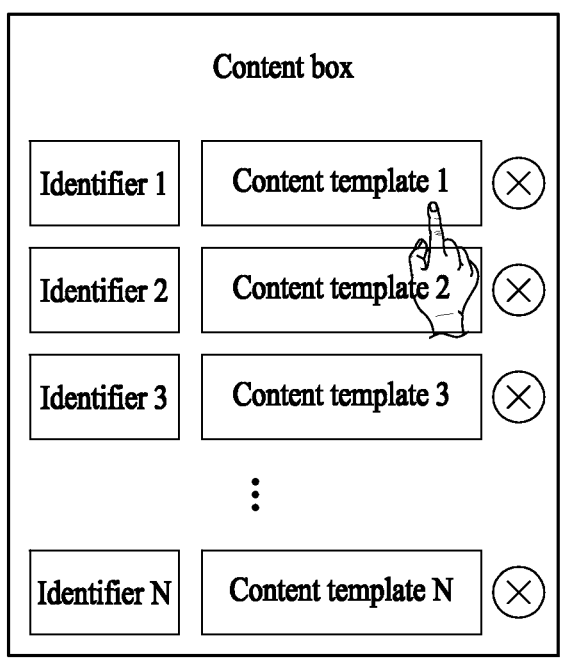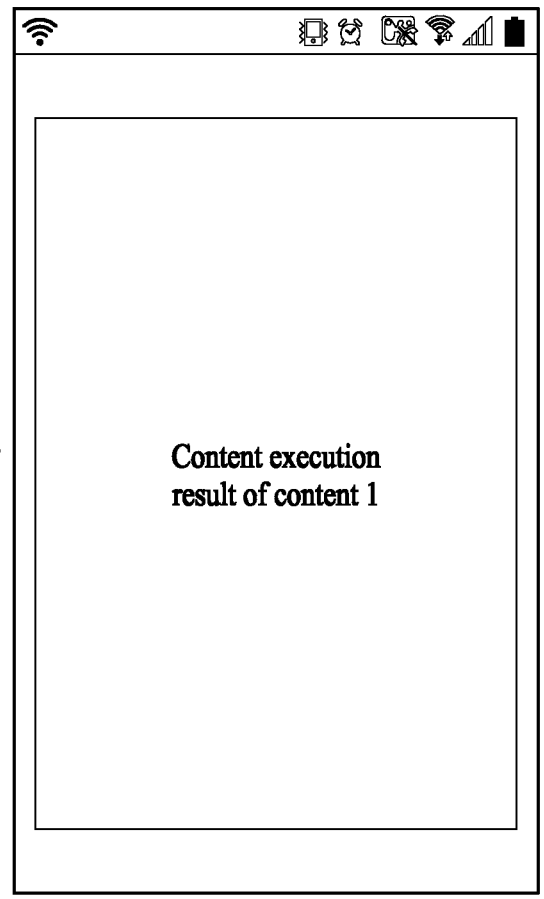
FIG. 9A
FIG. 9B

CONTENT BOX PROVIDING METHOD AND USER TERMINAL

TECHNICAL FIELD

The following description relates to a content box providing method and a user device.

BACKGROUND ART

A user may execute and receive a content through various paths. After performing such a content consuming activity, the user may desire to view the content again. However, the consumption of the content may not be readily activated when the consumption of the content is suspended due to an event occurring while the user is consuming the content, or when numerous operations are required to consume the same content again.

Thus, there is a need for a tool that enables content sharing and continuous consumption of various contents.

DISCLOSURE OF INVENTION

Technical Goals

An aspect provides a method and device for managing a content using a separate interface such as a content box after executing the content requested by a user device, and then readily reusing the content afterward.

Another aspect provides a method and device for enabling continuous consumption of a content by more readily adding content templates displayed on a content box through an automatic request, in addition to an intentional request of a user device, when consumption of the content is interrupted by an application.

Technical Solutions

According to an example embodiment, there is provided a content box providing method performed by a user device, the content box providing method including: displaying a content execution result for a content on a screen of the user device, determining whether a content box generation condition that the screen on which the content execution result is displayed is changed by an event occurs while the content execution result is being displayed, generating a content box when the content box generation condition occurs, and providing the generated content box.

The screen on which the content execution result is displayed may be switched to another screen of the user device by an event while the content execution result is being displayed on the screen of the user device or may not be displayed on the user device.

According to an example embodiment, there is provided a content box providing method performed by a user device, the content box providing method including: displaying a link shared through a chat room in a chatting application; when a selection for the link is received, displaying a screen of a content execution result for a content corresponding to the link through an in-app browser of the chatting application or an external browser distinguished from the chatting application; displaying a notification of a new chat message while the screen of the content execution result is being displayed through the in-app browser or the external browser; when a selection for the notification of the new chat message is received, switching the screen of the content execution result displayed on the in-app browser or the external browser to a screen of a chat room provided by the chatting application to which the new chat message corresponding to the notification is input; and displaying, on the switched screen of the chat room, a content box accessible to the content execution result.

The content box may include at least one content template corresponding to the content.

The content template may include at least one of information identifying the content or information representing the content execution result for the content and may correspond to a slot in the content box.

When a content template included in the content box is selected, the content box providing method may further include displaying a content execution result for a content corresponding to the selected content template.

The content template included in the content box may be shared based on a sharing request from the user device, and by the sharing request, the content corresponding to the content template or the content execution result for the content may be shared through an application.

The content box may be shared by and provided in different user devices to which the same user information is input.

The content box may be provided by being overlaid in the form of a floating menu on a chat window displayed on the screen of the chat room or provided as a menu of the chatting application.

When the content box is extended, the chatting application may provide, through the extended content box, the content template including the information identifying the content or the information representing the content execution result.

In the content box, a content template arranged based on a preset priority may be displayed, or a content template may be displayed in an area classified by category.

When the screen of the chatting application is switched to an execution screen of another application while the content execution result is being displayed through the in-app browser or the external browser, the content box providing method may further include displaying the content box on the execution screen of the other application.

According to an example embodiment, there is provided a user device in which a program for executing a content box providing method is installed. The program may include displaying a link shared through a chat room in a chatting application; when a selection for the link is received, displaying a screen of a content execution result for a content corresponding to the link through an in-app browser of the chatting application or an external browser; displaying a notification of a new chat message while the screen of the content execution result is being displayed through the in-app browser or the external browser; when the notification of the chat message is selected, switching the screen of the content execution result displayed on the in-app browser or the external browser to a screen of a chat room provided by the chatting application to which the new chat message corresponding to the notification is input; and displaying a content box accessible to the content execution result on the switched screen of the chat room.

The content box may include at least one content template corresponding to the content.

The content template may include at least one of information identifying the content or information representing the content execution result for the content, and may correspond to one slot in the content box.

When a content template included in the content box is selected, the content box providing method may further include displaying a content execution result for a content corresponding to the selected content template.

The content template included in the content box may be shared based on a sharing request from the user device, and by the sharing request, a content corresponding to the content template or a content execution result for the content may be shared through an application.

The content box may be shared by and provided in different user devices to which the same user information is input.

The content box may be provided by being overlaid in the form of a floating menu on a chat window displayed on the screen of the chat room or provided as a menu of the chatting application.

When the content box is extended, the chatting application may provide, through the extended content box, the content template including the information identifying the content or the information representing the content execution result for the content.

In the content box, a content template arranged based on a preset priority may be displayed, or a content template may be displayed in an area classified by category.

When the content execution result is switched to an execution screen of another application different from the chatting application while being displayed through the in-app browser or the external browser, the content box providing method may further include displaying the content box on the execution screen of the other application.

Effects of Invention

According to example embodiments described herein, it is possible to manage a content using a separate interface such as a content box after executing the content requested by a user device, and readily reuse the content afterward.

According to example embodiments described herein, it is possible to continuously consume a content by more readily adding content templates displayed on a content box through an automatic request, in addition to an intentional request by a user device, when consumption of the content is interrupted by an application.

BRIEF DESCRIPTION OF DRAWINGS

FIGS. 9A and 9B are diagrams illustrating an example of a process in which a content template is selected from a content box and a content is consumed again according to an example embodiment.

BEST MODE FOR CARRYING OUT INVENTION

Figure 1:
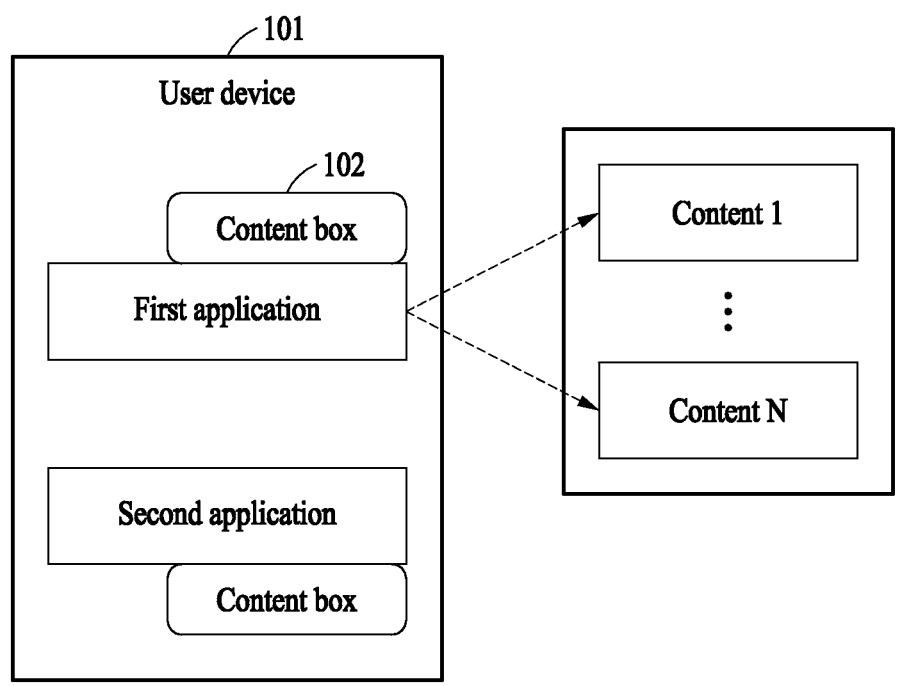
FIG. 1 is a diagram illustrating an example of a process in which a content box is generated based on a content consumed through an application according to an example embodiment.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

It should be understood, however, that there is no intent to limit this disclosure to the particular example embodiments disclosed. On the contrary, example embodiments are to cover all modifications, equivalents, and alternatives falling within the scope of the example embodiments.

Terms, such as first, second, and the like, are used herein to describe components. These terms are used only to distinguish one component from another component. For example, a first component may be referred to as a second component, or similarly, the second component may also be referred to as the first component.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, example embodiments will be described in detail with reference to the accompanying drawings.

FIG. 1 is a diagram illustrating an example of a process in which a content box is generated based on a content consumed through an application according to an example embodiment.

Referring to FIG. 1, an application may be installed in a user device 101. An application described herein may be a program in which a content is consumed in a user device through provision, processing, and/or execution of the content. Herein, "consuming a content" or "consumption of a content" may indicate that the content is used as a user verifies a result of executing the content through a screen of a user device of the user. Herein, a result of executing a content may also be referred to herein as a content execution result or a content execution result for a content.

A content described herein may be data, for example, link information (e.g., a uniform resource locator (URL)) and a file, that is executable in a user device and include, for example, a text, a still image, a video, or a combination thereof.

In the example of FIG. 1, a first application and a second application are illustrated. The first application may request execution of a content by transmitting the content to the second application. For example, the first application may be a chatting application and the second application may be a browser application. In this example, the browser application may be an in-app browser of the chatting application or an external browser application distinguished from the chatting application.

When link information is shared in a chat room of the first application and the link information is executed, the second application may display a web page identified through the link information. That is, according to an example embodiment, the first application may be an application that requests execution of a content, and the second application may be an application that executes the content by the request transmitted from the first application and displays a result of executing the content through a screen of a user device.

According to another example embodiment, applications may independently execute a content without transmitting a request for execution of the content between the applications. That is, an application may execute a content even when there is no request to execute the content from another application.

After a result of executing the content in the application is displayed on a screen of a user device, the user device may determine whether a condition for generating a content box 102 occurs. According to an example embodiment, the condition for generating the content box 102 may also be referred to herein as a content box generation condition, and the content box generation condition may correspond to a case when a screen of a user device is switched or changed by an event after a content execution result is displayed on the screen.

A content box, for example, the content box 102 illustrated in FIG. 1, may include one or more content templates corresponding to contents. The content templates may respectively correspond to the contents, and each of the content templates may include information for identifying a content (e.g., a name, an icon, an URL address of the content, etc.) or information for representing a content execution result (e.g., a name/title, an author, a source, a link, or a thumbnail image (a result of capturing an entirety or part of a content execution result) of the content, etc.). In addition, each of the content templates may correspond to one slot in the content box 102. Each of the content templates may temporarily or permanently store, in a slot, the information for identifying a content or information for representing a content execution result. When a content template included in the content box 102 is selected afterward, a content execution result for a content corresponding to the selected content template may be provided again, thereby allowing the content to be readily accessible.

In this case, the content box 102 may be displayed in the form of an identifier (e.g., an icon) or a menu. In addition, when a content is a page accessed through a link, the content box 102 may be used as an identifier used to access the page again. The content box 102 may include information (e.g., summary information of the content) identifying the content accessed through the link, to allow the user to readily identify a content connected to the content box 102.

Herein, that a content box, for example, the content box 102, is generated may indicate that a content template is added to the content box, for example, the content box 102. When a content corresponding to the content template added to the content box 102 is executed and a content execution result for the content is displayed on a screen of the user device 101, the content may be applied in the form of the content template in response to the addition to the content box 102.

That is, a content for which a content execution result is not displayed on the screen of the user device 101 may not be considered being consumed by a user, and thus the content corresponding to the content template added to the content box 102 may need to be executed by the application, and the content execution result may also need to be displayed on the screen of the user device 101. In addition, a content box generation condition may correspond to a case in which a content consuming activity of a user who uses or views a content execution result through a screen of a user device is prevented or interrupted by a certain event.

According to an example embodiment, a content box may be generated or updated as a content template is added thereto. In addition, when a screen on which a content execution result is displayed is switched and is not displayed by an event and an activity of consuming a corresponding content is thus interrupted or suspended, a content box may be generated to facilitate access to the content, thereby allowing consumption of the content to be resumed. To this end, the content box may be generated by adding, to the content box, a content template including information for identifying the content for which the consuming activity is interrupted or suspended as the screen is switched by the event or information for representing a content execution result for the content.

The content box may be provided to a user device by being displayed in the form of a menu or an identifier on the user device. According to an example embodiment, even though a content box is generated due to the occurrence of an event after a content execution result for a content processed in a certain application is displayed, the content box may be provided through another application through which the content execution result is not displayed. In addition, the content box may be provided through one area among a main screen of a user device, an execution screen of an application executed in the user device, and a menu of an application installed in the user device, based on an activity of a user that is applied to the user device.

That is, a content box may be continuously maintained through a screen of a user device, thereby allowing a content consuming activity to be resumed through the content box, even when the screen is switched and the content consuming activity is thus suspended after a content execution result for a corresponding content is displayed on the screen.

Figure 2:
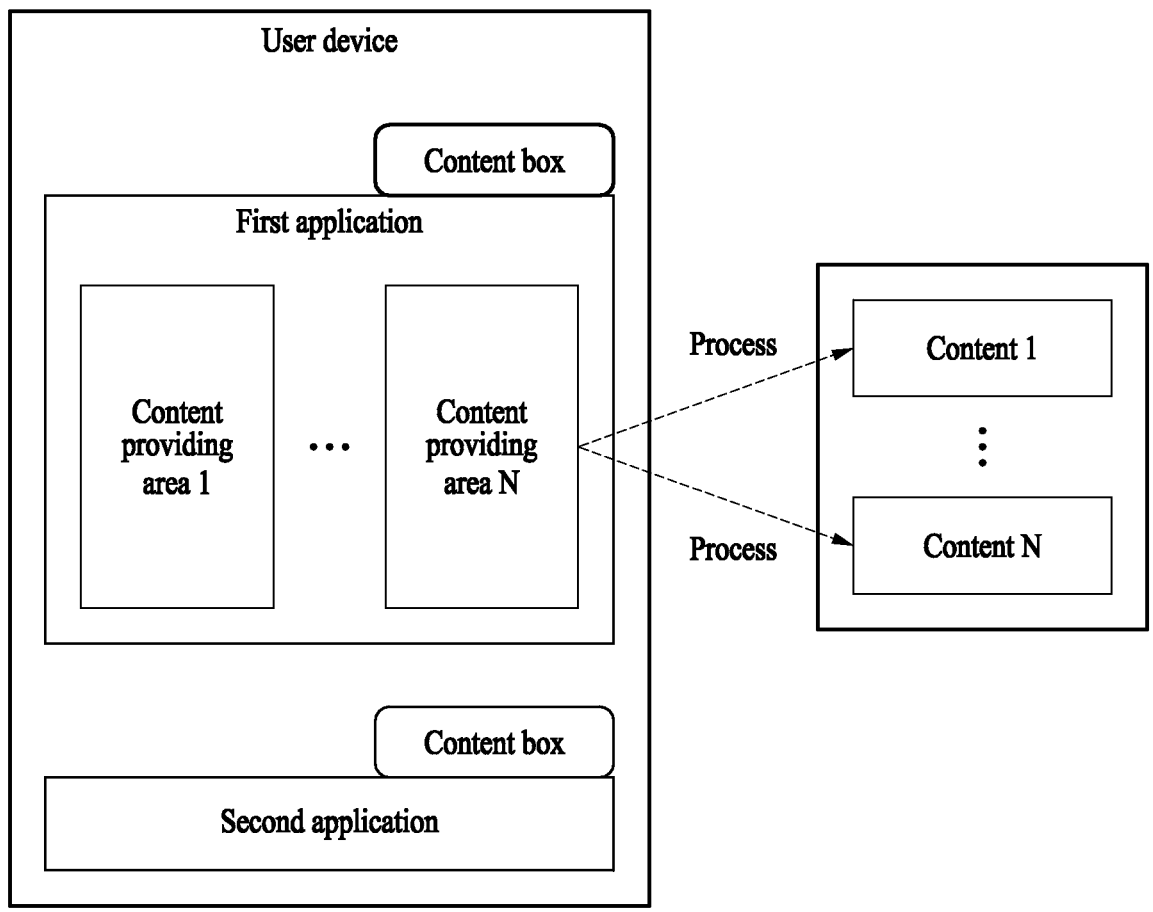
FIG. 2 is a diagram illustrating an example of a process in which a content box is generated based on a content consumed through a content providing area in an application according to an example embodiment.

FIG. 2 is a diagram illustrating an example of a process in which a content box is generated based on a content consumed through a content providing area in an application according to an example embodiment.

Referring to FIG. 2, a content execution result for a content may be displayed through a content providing area in an application. The content providing area may include, for example, a tab, a channel, a menu, a function, an in-app browser, and the like, of the application through which the content execution result is displayed. The content providing area may be switched or changed by a request of a user in the application, and may include any types of interface through which the content execution result is displayed.

That is, the content execution result may be provided through various areas in the application, and an area in which the content execution result is displayed may be defined as the content providing area. In addition, the content providing area may be identified through an identifier in the application and be switched or changed by a request of a user.

Figure 3:
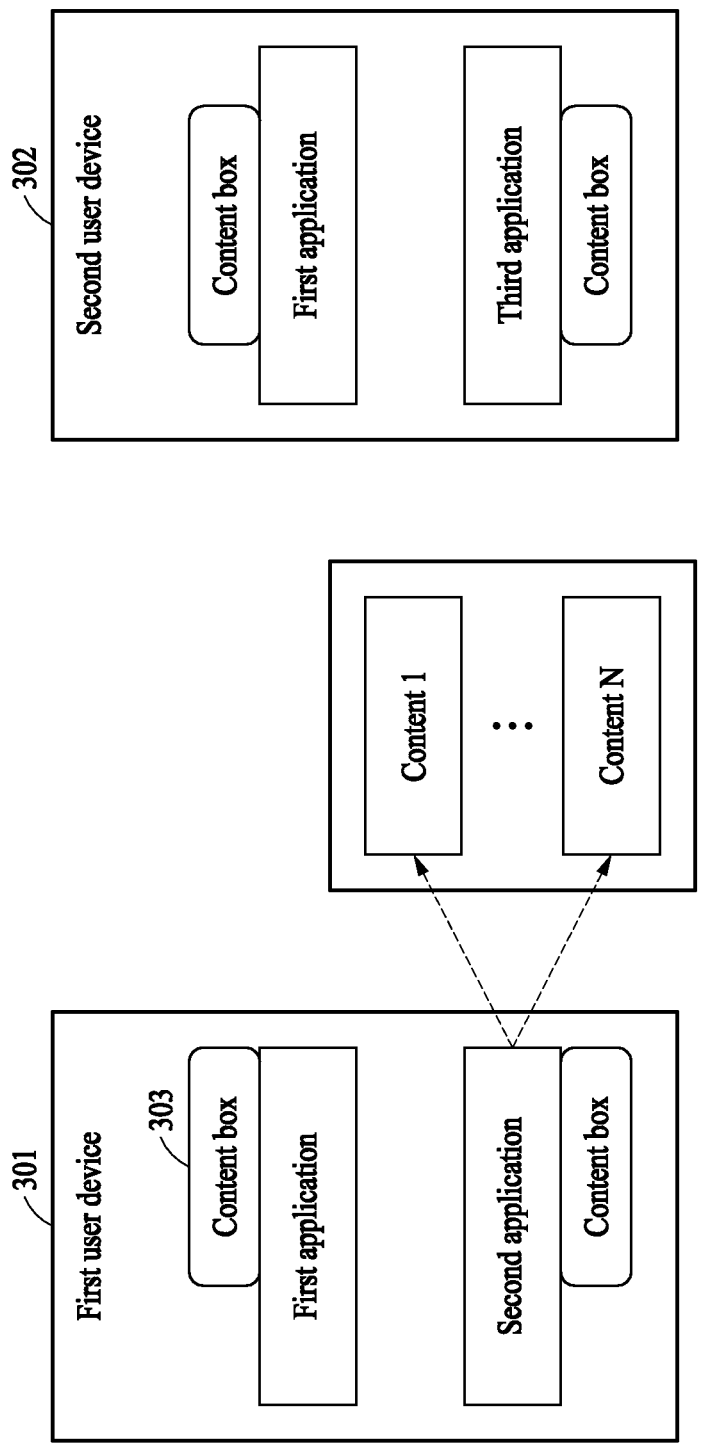
FIG. 3 is a diagram illustrating an example of a process in which a content box is shared by user devices according to an example embodiment.

FIG. 3 is a diagram illustrating an example of a process in which a content box is shared by user devices according to an example embodiment.

Referring to FIG. 3, a content box 303 may be generated in a first user device 301. The content box 303 generated or determined in the first user device 301 may also be provided to a second user device 302.

In this case, the first user device 301 and the second user device 302 may have the same application that may be logged into by the same account. For example, when the first user device 301 is a mobile phone and the second user device 302 is a personal computer (PC), and a first application is a chatting application, the content box 303 provided in the first application installed in the first user device 301 may be provided in the same way to the second user device 302 through a second application installed in the second user device 302.

When the content box 303 is generated as a content is executed by a second application of the first user device 301, the content box 303 may also be provided and applied to the first application installed in the first user device 301 in addition to the second application. That is, even when a content box is generated based on a content execution result for a content provided through a certain application, the content box may also be provided through another application. In addition, when the same application that may be logged into by the same account as in the first user device 301 is installed in the second device 302, the content box 303 provided through the first application in the user device 301 may be provided through the first application in the second user device 302. Further, the content box 303 may also be provided in a third application executed in the second user device 302.

Figures 4A, 4B:
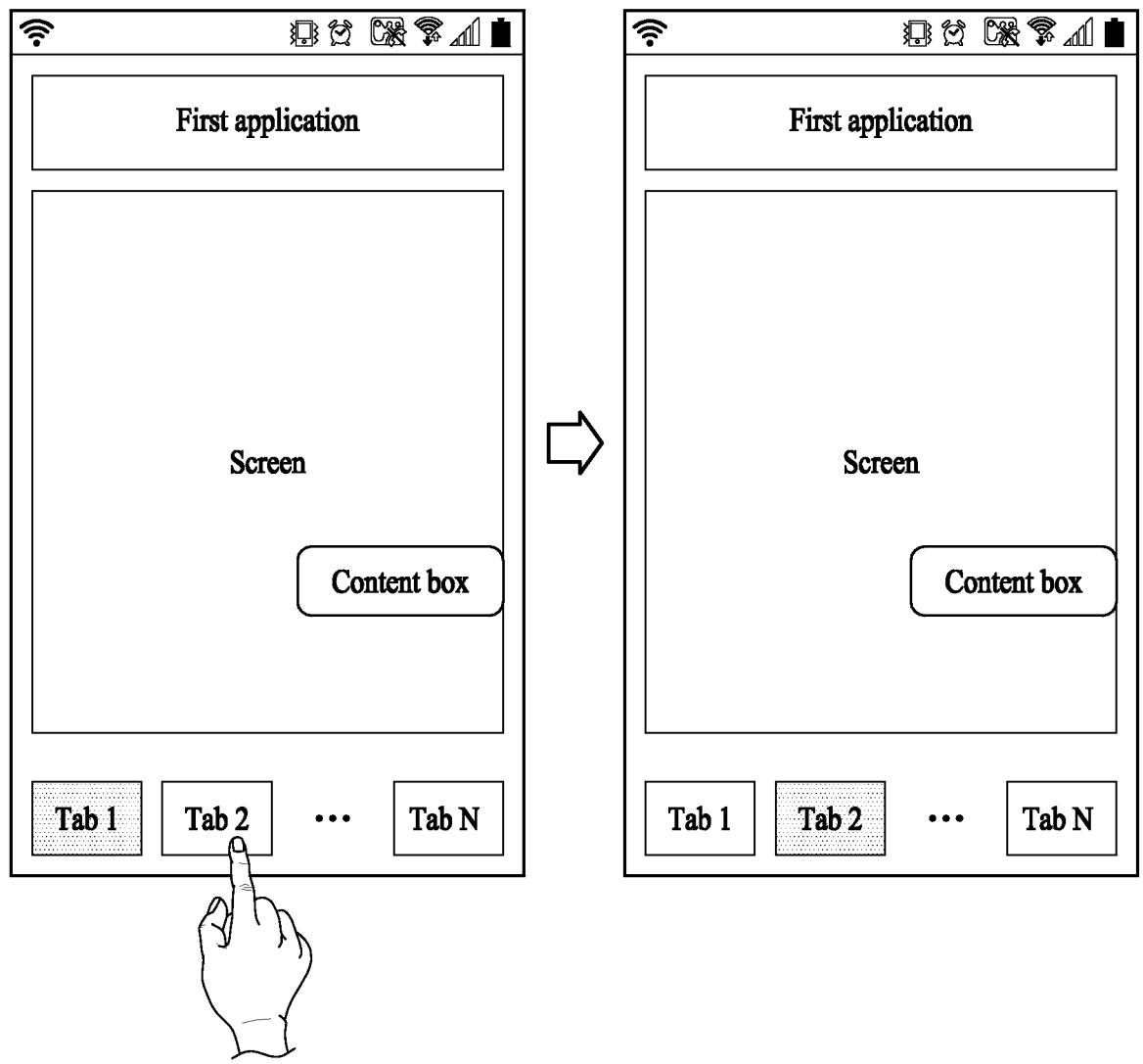
FIGS. 4A and 4B are diagrams illustrating an example of a process in which a content box is provided according to an example embodiment.

FIGS. 4A and 4B are diagrams illustrating an example of a process in which a content box is provided according to an example embodiment.

Referring to FIGS. 4A and 4B, a content box may be generated and then be provided through a user device. The content box may need to continue to be provided while a screen of the user device is being maintained. As illustrated in FIG. 4A, a plurality of tabs may be displayed. A tab used herein may indicate an identifier indicating a content providing area such as a menu, a function, a channel, and the like in an application that may be switched or changed by a request of a user such that various activities or results are provided. Even when the screen is switched or changed as different tabs are selected from the user device, the content box may continue to be maintained and provided on the screen.

Also, the content box may be provided only in a service providing area that performs a certain function. The service providing area in which the content box is provided may be determined in advance by a service provider or selected by the user. For example, in the case of a chatting application, the content box may be provided in at least one service providing area determined from among a friend list tab, a chat room list tab, a chat room, and the like.

In such a case, the content box may be provided in a portion of the screen of the user device to prevent a content execution result provided through the application from being interrupted or hindered. A position of the content box may be changed or moved by a request of the user, and the content box may be displayed by being overlaid on the screen. Hereinafter, how a content consuming activity is resumed through a content box will be described in detail with reference to FIGS. 7A and 7B.

Figure 5C:
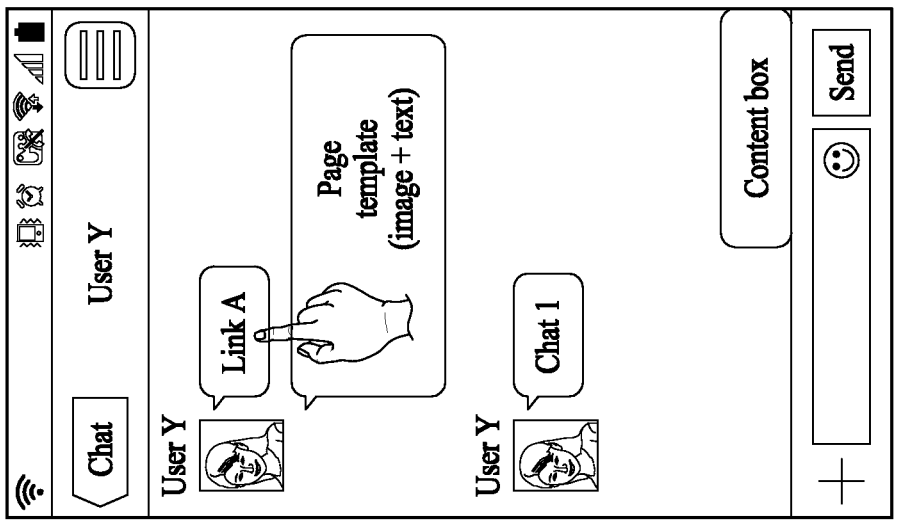
FIGS. 5A-5C are diagrams illustrating an example of a process in which a content box is generated when a screen is switched in an application according to an example embodiment.
Figure 5B:
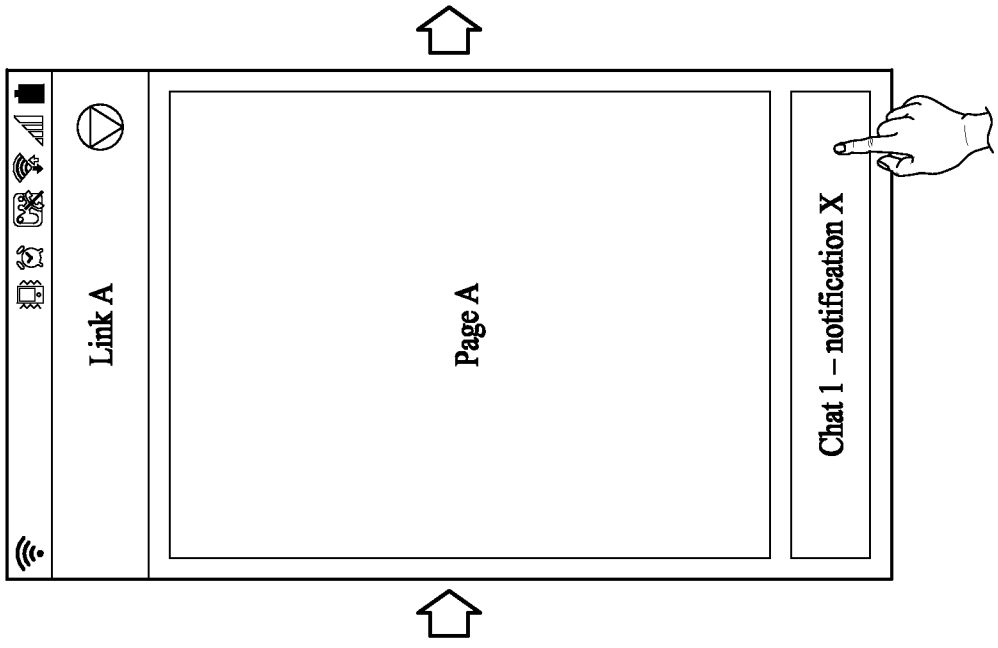
Figure 5A:
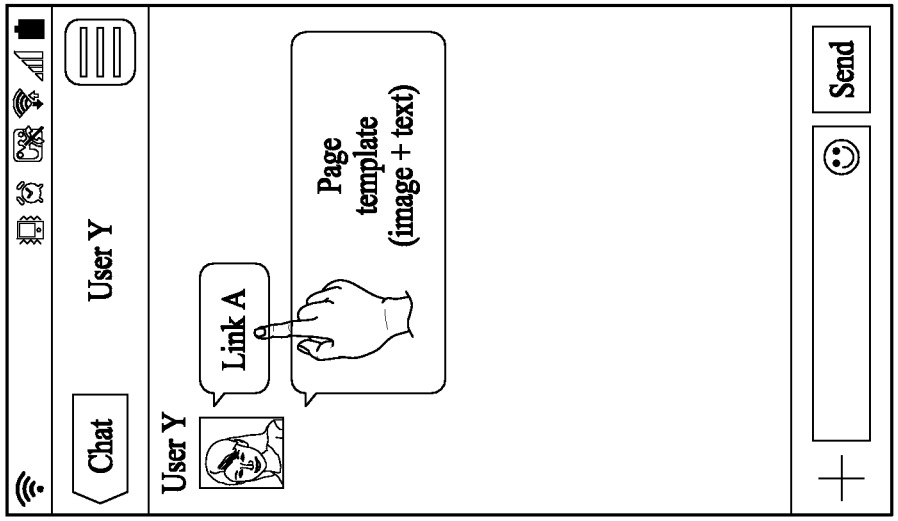

FIGS. 5A-5C are diagrams illustrating an example of a process in which a content box is generated when a screen is switched in an application according to an example embodiment.

A link may be shared through a chat room of a chatting application (or a first application) installed in a user device. For example, when link A is selected from user device as illustrated in FIG. 5A, a browsing application (or an in-app browser of a first application or an external browser separated from the first application) may be executed in the user device and page A corresponding to link A may be displayed on a screen as illustrated in FIG. 5B. In this example, link A may correspond to a content, and page A displayed on a screen of the user device may correspond to a content execution result for the content.

In a situation where page A is being displayed on the screen of the user device as illustrated in FIG. 5B, when a new chat message (e.g., chat 1) is input to a chat room of a chatting application, a notification of the chat message is displayed, and the notification of the chat message is selected by the user device, the new chat message (e.g., chat 1) may be input into the chat room in which link A is shared or into another chat room that is not the chat room in which link A is shared.

When the notification of the chat message is selected by the input of the new chat message, a chat room screen on which the new chat message corresponding to the notification is displayed may then be displayed as illustrated in FIG. 5C. That is, a content execution screen illustrated in FIG. 5B may be switched to the chat room screen, and the chat room screen may be displayed in the chatting application operating in the background. That is, when the content execution screen is switched to the chat room screen, the content execution screen may disappear from the screen of the user device that is being viewed by the user by the switched chat room screen. In such a case, as illustrated in FIG. 5C, a content box including a content template corresponding to the content may be displayed on the chat room screen for easy access to page A corresponding to link A which is the content being consumed in the user device. That is, when the content execution screen is switched to the chat room screen, the content box may be displayed on the switched chat room screen. In addition, when another application different from the chatting application is executed while page A is being displayed through a browser (e.g., an in-app browser) interlocked with the chatting application or a browser (e.g., an out-app browser) distinguished from the chatting application, the content box may be displayed on an execution screen of the other application.

The content box may be provided by being overlaid on the chat room screen. The content box may be provided in the form of a floating menu on the chat room screen, and be switched to page A from the chat room screen again. Alternatively, the content box may be provided in the form of a menu of a certain application, and be displayed when the menu is selected.

Here, by an event that a user who selects link A which is the content and verifies page A which is the content execution result selects the notification of the chat message, the screen of page A may be switched to the chat room screen and consumption of the content by the user through page A may be interrupted. Even though the consumption of the content by the user through page A is interrupted, the user may access page A again through the content box. Thus, even when consumption of a content is interrupted or suspended by a certain event, the consumption may continue to be maintained afterward through a content box.

The content box may be provided only in a service providing area that performs a certain function. The service providing area in which the content box is provided may be determined in advance by a service provider or selected by a user. For example, in the case of a chatting application, a content box may be provided in at least one service providing area determined from among, for example, a friend list tab, a chat room list tab, and a chat room.

For example, when link A is selected in a user device under the assumption that a link is shared through a chat room in a chatting application (e.g., a first application) installed in the user device, a browsing application may be executed in the user device and page A corresponding to link A may be executed as illustrated in FIG. 5B. In this example, link A may correspond to a content and page A displayed on the user device may correspond to a content execution result for the content.

Although not illustrated in FIGS. 5A-5C, while the user is verifying page A which is the content execution result, the user may select an identifier (e.g., an icon) that requests the generation of a content box in the user device. This case may not be construed as being a case in which a content execution screen in the user device is switched by a certain event, but be construed as being a case in which the generation of the content box is intentionally requested by a separate request applied to the user device.

When a content box generation condition occurs after page A which is a result of executing link A (or the content) is displayed, the content box may be generated and a content template that enables access to link A may be added thereto. Then, even when the user closes the screen on which page A is displayed and executes another application afterward, the content box may be displayed and provided on an execution screen of the application.

Figure 6A:
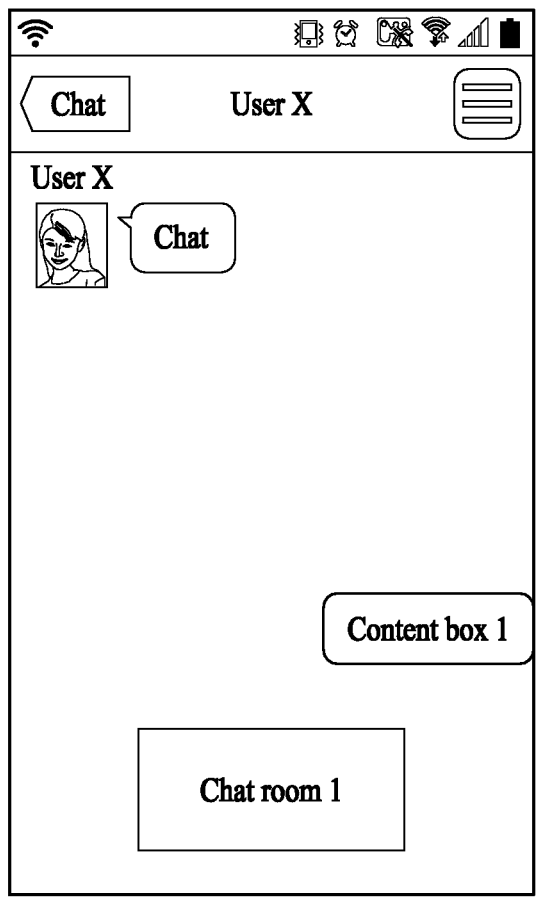
FIGS. 6A and 6B are diagrams illustrating an example of a process in which a content box is provided depending on a chat room in a chatting application according to an example embodiment.
Figure 6B:
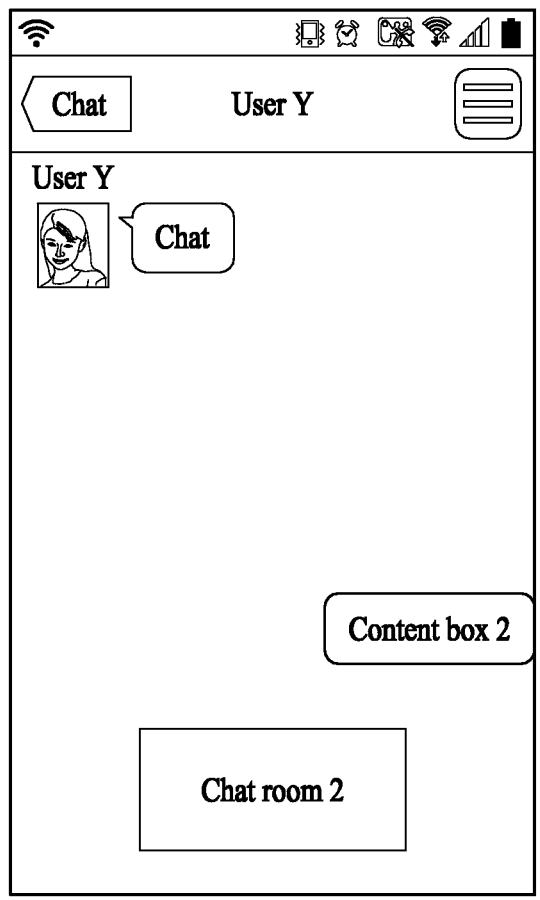

FIGS. 6A and 6B are diagrams illustrating an example of a process in which a content box is provided depending on a chat room in a chatting application according to an example embodiment.

A content box to be provided to a chat room in an application may differ for each chat room in the application.

Referring to FIGS. 6A and 6B, a content shared in chat room 1 of a chatting application may differ from a content shared in chat room 2 of the chatting application, and thus a content box to be provided to each chat room may thus differ for each chat room. That is, content box 1 may be provided when a user enters chat room 1, and content box 2 may be provided when the user enters chat room 2. A content box may be displayed on a chat room screen that is displayed when a user enters a corresponding chat room or on a chat room list including a plurality of chat rooms displayed before the user enters a chat room, and provided accordingly.

Figure 7A:
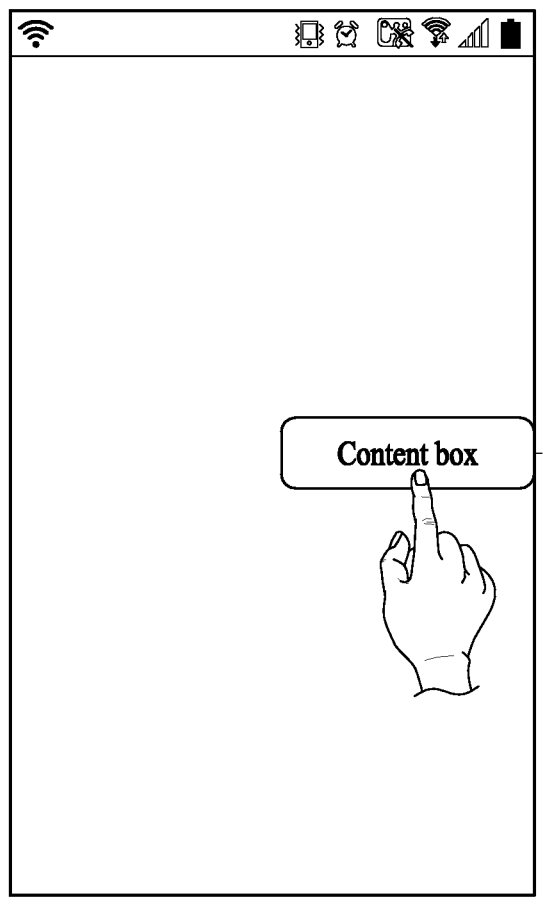
FIGS. 7A and 7B are diagrams illustrating an example of a content template included in a content box according to an example embodiment.
Figure 7B:
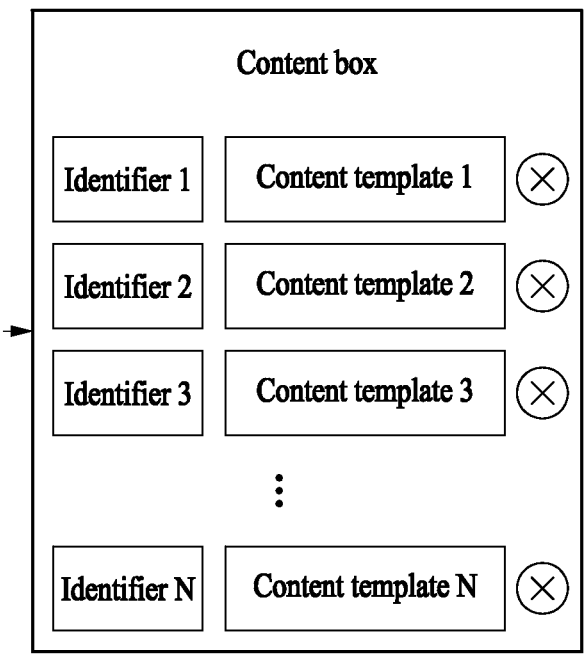

FIGS. 7A and 7B are diagrams illustrating an example of a content template included in a content box according to an example embodiment.

A content box may be displayed on a screen of a user device. For example, a content box may be displayed on a screen of a user device as illustrated in FIG. 7A. In this example, the content box may be displayed on an execution screen of an application in the user device. The execution screen of an application may be a screen indicating that the application is being executed. The content box may also be provided in the form of a menu of a certain application or in the form of a floating menu on a screen, and a position of the content box may be changed or moved through a drag on the screen of the user device. The content box may be maintained on the screen of the user device even when the screen of the user device is switched or changed by an action or activity performed by a user of the user device.

After the content box is displayed on the screen of the user device, the content box may be selected as illustrated in FIG. 7A. When the content box is selected, the content box may extend as illustrated in FIG. 7B. As illustrated, a content template including information for identifying a content or information representing a content execution result may be displayed on the content box. A content template may correspond to a content. For each content template, an identifier may also be provided. An identifier of a content template may include, for example, a name of a corresponding content, an image or icon associated with the content, bibliographic information of the content, a source of the content, a category of the content, and the like.

In the case in which a content template is previously selected from the content box or is not yet selected, this may be displayed in highlight, for example, in color or shade.

A content template displayed in the content box may be represented by one slot. In the user device, content templates may be arranged based on a priority and displayed in the content box as arranged. For example, a content template may be arranged in the content box based on a time at which the content template is added, and thus a most recently added content template may be displayed uppermost.

A content box may be an interface that is displayed in a portion of a screen of a user device, and thus the number of content templates to be displayed on the screen may be limited to a preset number, for example, five. In such a case, a content template that is not displayed on the screen may be further displayed when an area of the content box extends through an extension function.

However, when the number of content templates allowed to be included in the content box exceeds a preset number, the user device may display a notification for selecting and deleting a content template included in the content box. Alternatively, the user device may automatically delete, from the content box, a content template added at an oldest time from a current time.

Figure 8A:
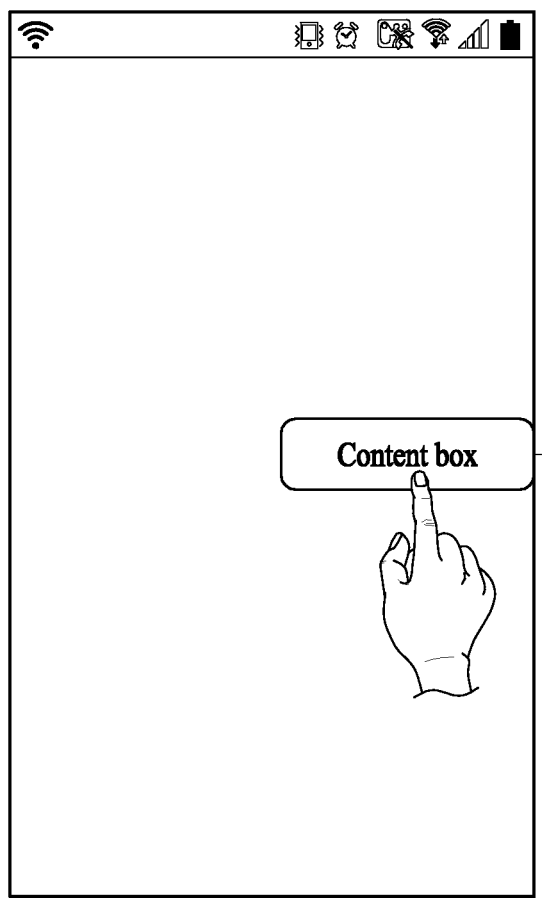
FIGS. 8A and 8B are diagrams illustrating an example of a process in which a content box is provided as content templates are classified therein by category according to an example embodiment.
Figure 8B:
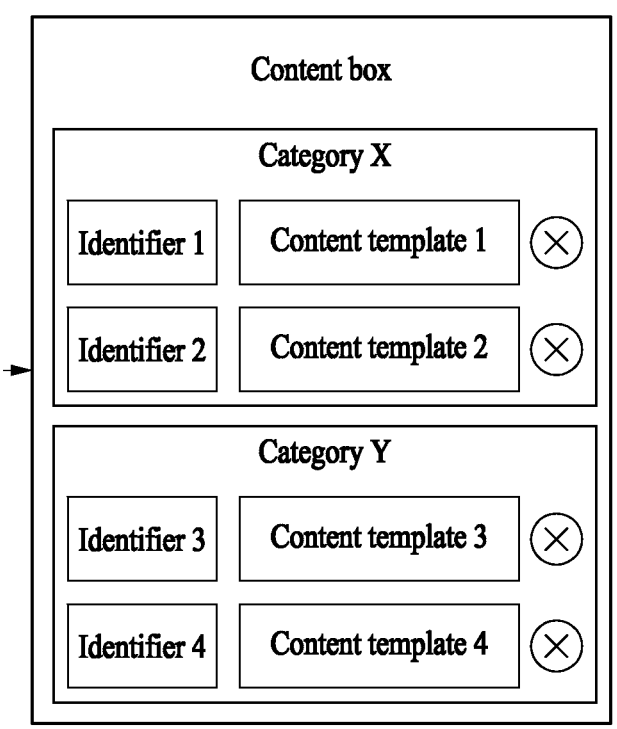

FIGS. 8A and 8B are diagrams illustrating an example of a process in which a content box is provided as content templates are classified therein by category according to an example embodiment.

Referring to FIGS. 8A and 8B dissimilar to the example described above with reference to FIGS. 7A and 7B, content templates may be classified in a content box by each category. For example, a category may be a type of application or a source from which a content corresponding to a content template is derived.

The type of application may include, for example, a chatting application, a multimedia application, a document application, a browser application, and the like. The source may include, for example, a processing area classified in an application, for example, each chat room in a chatting application.

For an order in which categories are arranged, the categories may be arranged in an order that is set in a user device, or a category associated with a content template that is frequently selected from a content box displayed in a user device may be arranged first.

FIGS. 9A and 9B are diagrams illustrating an example of a process in which a content template is selected from a content box and a content is consumed again according to an example embodiment.

Referring to FIG. 9A, one content template, for example, content template 1, may be selected from among content templates displayed on a content box in a user device. When content template 1 is selected, a screen may be switched to an application that executes content 1 corresponding to selected contemplate 1, and then a content execution screen for content 1 may be displayed on the user device, as illustrated in FIG. 9B.

As described above, a content to be included in a content box may be included in the content box by a request for storing and managing the content in the content box from a user device while the content is being consumed by a user of the user device after executed in the user device, or may be automatically included in the content box when consumption of the content is interrupted by a switch of an application. In this case, when a corresponding content template included in the content box is selected, the consumption of the content may be suspended temporarily, but the consumption may be then resumed, allowing the consumption to be maintained.

Although not illustrated in FIGS. 9A and 9B, a request for sharing with another user device in a certain application may be received through a content box. In this case, to share a content execution result for a content corresponding to a content template included in the content box, the content template may be selected in the user device. The user device may then select an application or a user (e.g., a friend) with which the content execution result is to be shared. The content corresponding to the content template may then be executed, and the content execution result may be displayed on at least one of the user device that desires to share or a user device sharing it.

For example, when a user X desires to share content 2 (or link 2) corresponding to content template 2 in a content box through a chatting application, content 2 may be shared in the chatting application, or a content execution screen for content 2 (or page 2 corresponding to link 2) may be displayed in a portion or an entire area of a chat room of the chatting application.

Figure 10:
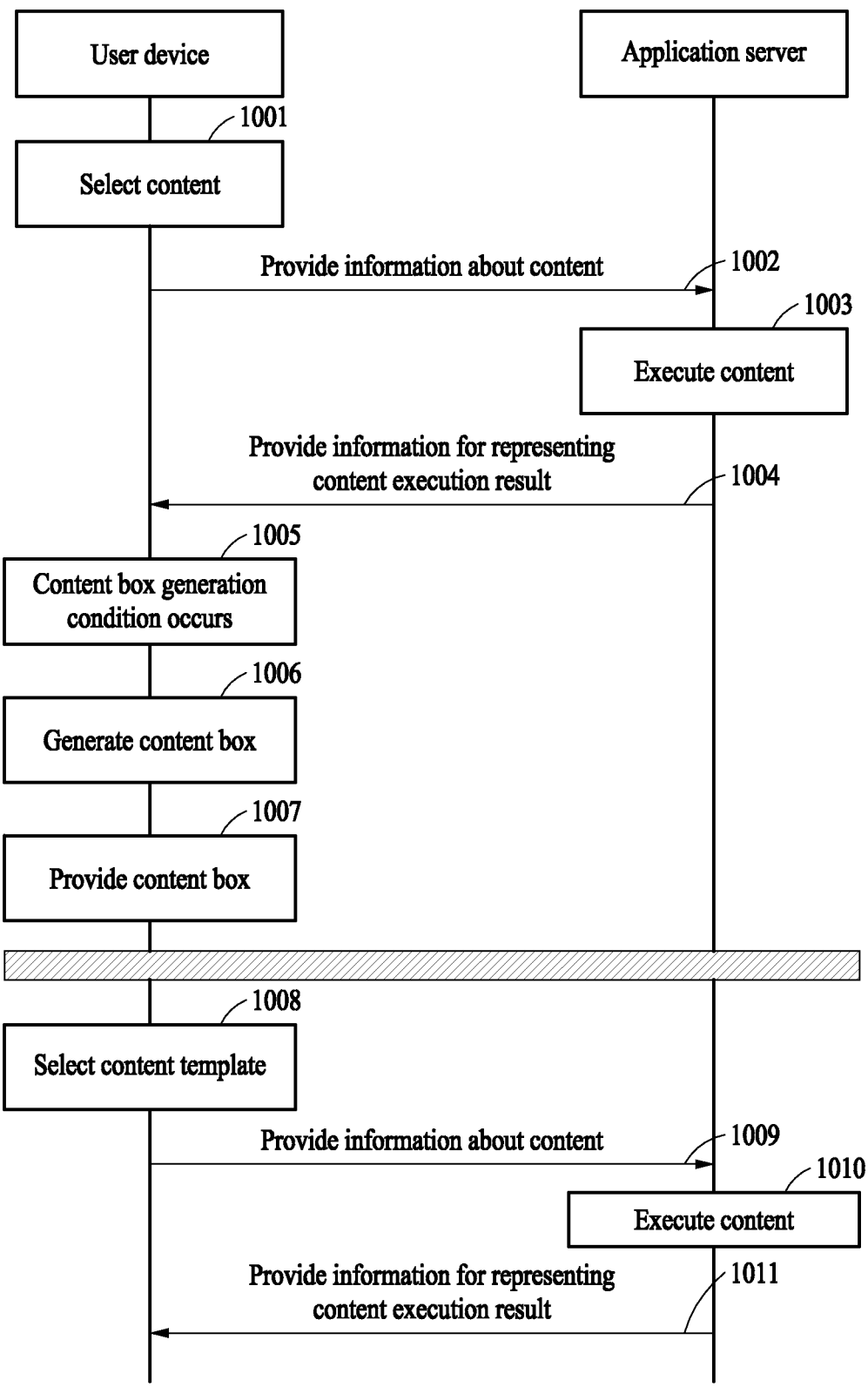
FIG. 10 is a flowchart illustrating an example of a content box providing method according to an example embodiment.

FIG. 10 is a flowchart illustrating an example of a content box providing method according to an example embodiment.

Referring to FIG. 10, in operation 1001, a user device may select a content. In operation 1002, the user device may provide identification information of the content to an application server. In operation 1003, the application server may execute the content selected by the user device. In operation 1004, the application server may provide a content execution result for the content to the user device.

The user device may then display the content execution result through an application. Here, when a content box generation condition occurs in operation 1005, the user device may generate a content box by adding a content template corresponding to the content to the content box in operation 1006. The content box generation condition may include a case in which a request for separately adding the content execution result to the content box occurs based on a request from the user device, or a case in which the content execution result is not displayed on the screen due to a certain event, for example, a case in which a content execution screen is occluded due to a switch of the application. In operation 1007, the user device may provide the content box on a screen displayed on the user device, for example, a main screen of the user device, an execution screen of the application in the user device, and the like. The content box may be provided by being displayed in a floating form on the screen of the user device, or an area thereof may extend by a selection made by a user. The content box may include one or more content templates each corresponding to each content and including information for identifying a content and information representing a content execution result for a corresponding content.

When the user device selects a content template added to the content box in operation 1008, the user device may provide the application server with information about a content corresponding to the selected content template in operation 1009. In operation 1010, the application server may execute the content selected by the user device. In operation 1011, the application server may provide the user device with a content execution result for the content.

As described above, as a content template added to a content box is selected, a user device may display a content execution result such that consumption of a corresponding content that is suspended temporarily due to the occurrence of a content box generation condition is resumed.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine-readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical discs. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in, special-purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments described in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

The invention claimed is:

1. A content box providing method performed by a user device, comprising:
displaying link information shared through a chat room in a chatting application;
in response to receiving a selection for the link information, displaying a content execution result corresponding to the link information through a browser of the chatting application;
in response to a selection by a user of a displayed notification of a new chat message received while the content execution result is being displayed through the browser of the chatting application,
switching the display of the content execution result displayed through the browser of the chatting application to a display of the chat room of the chatting application,
displaying a content box accessible to the content execution result with the display of the chat room in which the new chat message corresponding to the notification is displayed, and
in response to a user input through the content box, displaying the content execution result corresponding to the link information through the browser of the chatting application.

2. The content box providing method of claim 1, wherein the content box comprises at least one content template corresponding to the content.

3. The content box providing method of claim 2, wherein the content template comprises at least one of information identifying the content or information representing the content execution result for the content, and corresponds to a slot in the content box.

4. The content box providing method of claim 1, wherein the user input through the content box comprises at least one of:
a selection by the user for the content box; or
a selection by the user for a content template comprised in the content box.

5. The content box providing method of claim 1, wherein a content template comprised in the content box is shared based on a sharing request from the user device,
wherein, by the sharing request, a content corresponding to the content template or a content execution result for the content is shared through an application.

6. The content box providing method of claim 1, wherein the content box is shared by and provided in different user devices to which the same user information is input.

7. The content box providing method of claim 1, wherein the content box is provided by being overlaid in the form of a floating menu on a chat window displayed on the display of the chat room or is provided as a menu of the chatting application.

8. The content box providing method of claim 1, wherein, when the content box is extended, the chatting application provides, through the extended content box, a content template comprising information identifying the content or information representing the content execution result for the content.

9. The content box providing method of claim 8, wherein, in the content box, a content template arranged based on a preset priority is displayed, or a content template is displayed in an area classified by category.

10. The content box providing method of claim 1, further comprising: when the display of the chat room is switched to another screen while the content box is being displayed with the display of the chat room, maintaining the content box on the another screen.

11. The content box providing method of claim 1, wherein the content box changes in position through a drag on a screen of the user device.

12. The content box providing method of claim 1, wherein the content box is provided while dependent on the chat room in the chatting application.

13. A user device for providing a content box, the user device comprising:
one or more memories configured to collectively store computer instructions; and
one or more processors configured to collectively execute the computer instructions to:
display link information shared through a chat room in a chatting application;
in response to receiving a selection for the link information, display a content execution result corresponding to the link information through a browser of the chatting application;
in response to a selection by a user of a displayed notification of a new chat message received while the content execution result is being displayed through the browser of the chatting application,
switch the display of the content execution result displayed through the browser of the chatting application to a display of the chat room of the chatting application,
display a content box accessible to the content execution result with the display of the chat room in which the new chat message corresponding to the notification is displayed, and
in response to a user input through the content box, display the content execution result corresponding to the link information through the browser of the chatting application.

14. The user device of claim 13, wherein the content box comprises at least one content template corresponding to the content.

15. The user device of claim 13, wherein the content template comprises at least one of information identifying the content or information representing the content execution result for the content, and corresponds to one slot in the content box.

16. The user device of claim 13, wherein the user input through the content box comprises at least one of:
a selection by the user for the content box; or
a selection by the user for a content template comprised in the content box.

17. The user device of claim 13, wherein a content template comprised in the content box is shared based on a sharing request from the user device,
wherein, by the sharing request, a content corresponding to the content template or a content execution result for the content is shared through an application.

18. The user device of claim 13, wherein the content box is shared by and provided in different user devices to which the same user information is input.

19. The user device of claim 13, wherein the content box is provided by being overlaid in the form of a floating menu on a chat window displayed on the display of the chat room or is provided as a menu of the chatting application.

20. The user device of claim 13, wherein, when the content box is extended, the chatting application provides, through the extended content box, a content template comprising information identifying the content or information representing the content execution result for the content.

21. The user device of claim 20, wherein, in the content box, a content template arranged based on a preset priority is displayed, or a content template is displayed in an area classified by category.

22. The user device of claim 13, wherein one or more processors are further configured to: when the display of the chat room is switched to another screen while the content box is being displayed with the display of the chat room, maintaining the content box on the another screen.

23. One or more instances of computer media not constituting signals per se, collectively storing instructions that, when executed by one or more processors in a computing system, cause the one or more processors to perform actions, the actions comprising:
displaying link information shared through a chat room in a chatting application;
in response to receiving a selection for the link information, displaying a content execution result corresponding to the link information through a browser of the chatting application;
in response to a selection by a user of a displayed notification of a new chat message received while the content execution result is being displayed through the browser of the chatting application,
switching the display of the content execution result displayed through the browser of the chatting application to a display of the chat room of the chatting application,
displaying a content box accessible to the content execution result with the display of the chat room in which the new chat message corresponding to the notification is displayed; and
in response to a user input through the content box, displaying the content execution result corresponding to the link information through the browser of the chatting application.

\* \* \* \* \*